(12) United States Patent
Eriksson

(10) Patent No.: US 6,721,382 B1
(45) Date of Patent: Apr. 13, 2004

(54) ABSORBER MEMBER AND CONTROL ROD

(75) Inventor: Sven Eriksson, Skultuna (SE)

(73) Assignee: Westinghouse Atom AB, Vasteras (SE)

( * ) Notice: Subject to any disclaimer, the term of this patent is extended or adjusted under 35 U.S.C. 154(b) by 0 days.

(21) Appl. No.: 09/720,870

(22) PCT Filed: Jun. 30, 1999

(86) PCT No.: PCT/SE99/01191

§ 371 (c)(1), (2), (4) Date: Mar. 13, 2001

(87) PCT Pub. No.: WO00/02205

PCT Pub. Date: Jan. 13, 2000

(30) Foreign Application Priority Data

Jul. 2, 1998 (SE) ................................................. 9802378

(51) Int. Cl.$^7$ .................................................. G21C 7/06
(52) U.S. Cl. .................... 376/220; 376/219; 376/239; 376/339
(58) Field of Search ................. 376/219, 220, 376/239, 228, 327, 333, 335, 339

(56) References Cited

U.S. PATENT DOCUMENTS

| 3,485,717 | A | * | 12/1969 | Eich | 376/333 |
|---|---|---|---|---|---|
| 3,932,215 | A | * | 1/1976 | Kruger | 376/335 |
| 3,959,072 | A | * | 5/1976 | Dupen | 376/335 |
| 4,001,078 | A | * | 1/1977 | Doll | 376/335 |
| 4,076,587 | A | * | 2/1978 | Taulier et al. | 376/335 |
| 4,432,934 | A | * | 2/1984 | Gjertsen et al. | 376/333 |
| 5,276,718 | A |   | 1/1994 | Ueda | |
| 5,742,655 | A |   | 4/1998 | Hertz et al. | |

FOREIGN PATENT DOCUMENTS

| DE | 1092572 | * | 11/1960 | 376/335 |
|---|---|---|---|---|
| DE | 4121103 |   | 1/1992 | |
| EP | 0236114 |   | 9/1987 | |
| EP | 0237076 |   | 9/1987 | |
| JP | 61-112997 | * | 5/1986 | 376/335 |
| JP | 1-123195 |   | 5/1989 | |

* cited by examiner

Primary Examiner—Harold J. Tudor
Assistant Examiner—Daniel Matz
(74) Attorney, Agent, or Firm—Swidler Berlin Shereff Friedman, LLP

(57) ABSTRACT

An absorber body arranged to absorb radiation in a nuclear energy arrangement. The absorber body comprises more than one area with a locally reduced thickness.

16 Claims, 2 Drawing Sheets

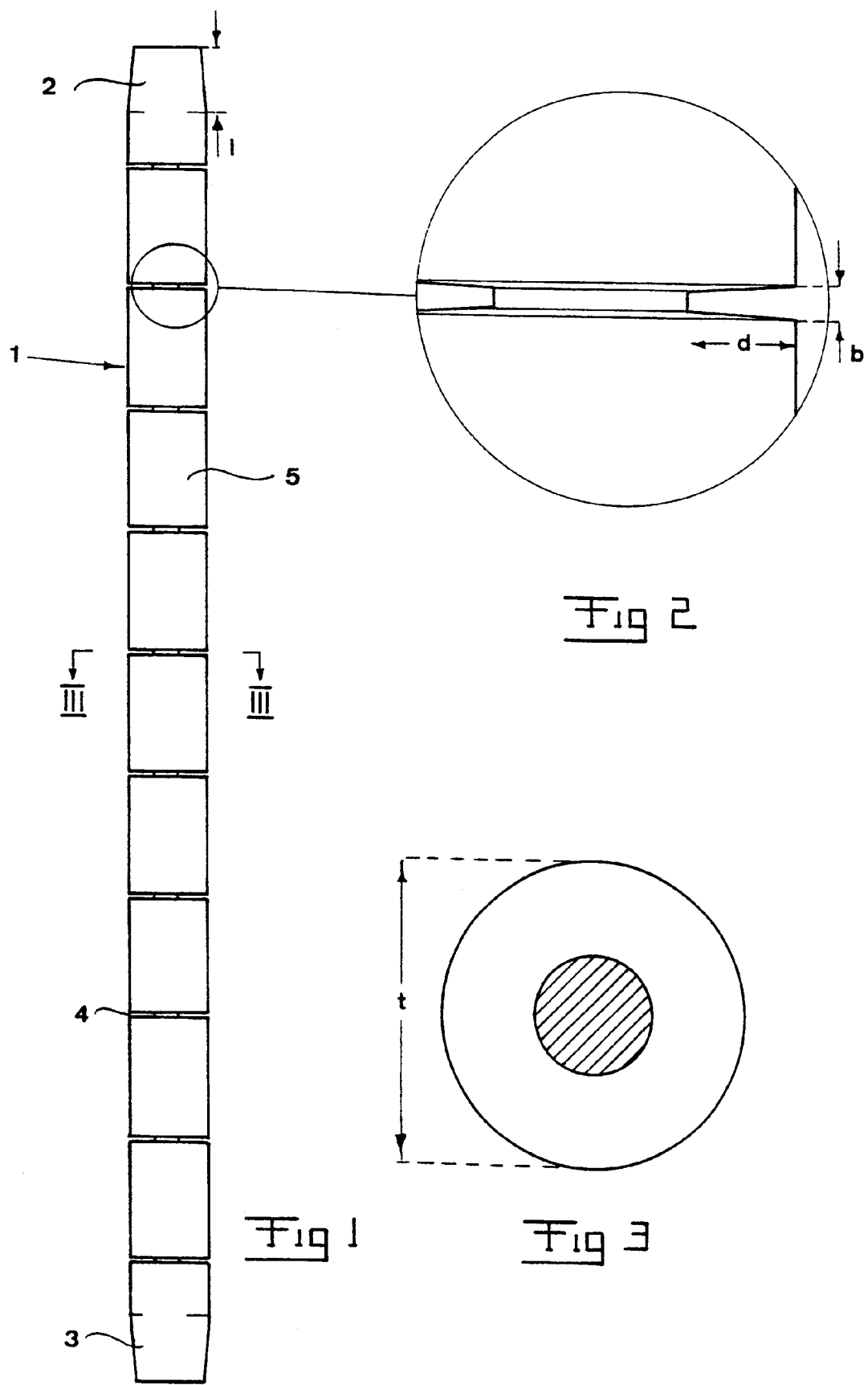

ABSORBER MEMBER AND CONTROL ROD

BACKGROUND OF THE INVENTION AND PRIOR ART

Figure 4:
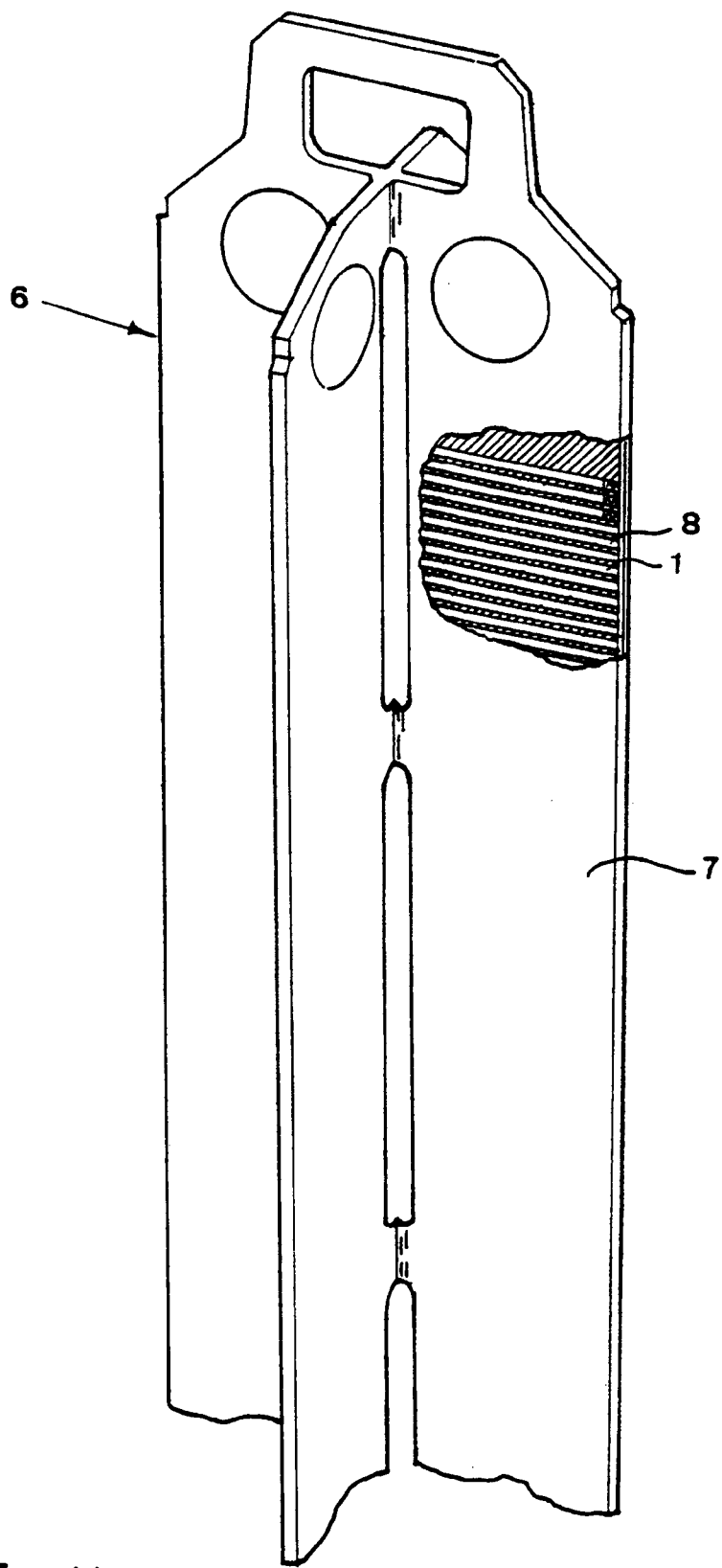

The present invention concerns an absorber body arranged to absorb radiation in a nuclear energy arrangement.

Such absorber bodies are already well known within nuclear energy technology. They are arranged to be positioned in control rods, by means of which the irradiation of nuclear fuel in the reactor core is controlled. The absorber bodies are thereby often formed by relatively small rods of for example boron carbide which are positioned in holes arranged in blades of said control rods. Normally a plurality of such absorber body rods is arranged end to end after each other in the respective holes in the blades of the control rod. The holes are then sealed such that the absorber bodies are hermetically enclosed in the control rods.

During the subsequent operation of the nuclear energy arrangement, it is the task of the absorber bodies to absorb neutron radiation which thereby exists. The usually used absorber body material, boron carbide, will thereby in the course of time expand when it is exposed to said radiation. The absorber body will thus expand both in axial and radial direction.

The radiation is not evenly distributed over the whole absorber body. For example the ends of the absorber body will be exposed to more radiation than the other parts of the absorber body. The reason for this is that the radiation, the neutrons, at the ends of the absorber body may impinge against the uncovered end surface of the absorber body and thus hit the end surface which thereby expands. Such an increased neutron flux against the absorber body is particularly manifested at the ends of the absorber bodies which are positioned at the ends of an array of a plurality of absorber bodies arranged after each other.

Furthermore, the intensity of the radiation is usually different on different sides of the absorber body. When the absorber body is formed by an elongated rod which thereby is exposed to an increased neutron flux against a part of its envelope surface, the rod will expand, i.e. swell up more along said part. The rod may thereby possibly be bent. The bend may be so large that the absorber rod abuts and applies pressure forces against the surrounding wall of the control rod. The control rod normally consists of steel with a tendency to stress corrosion. The bending of the absorber rod thus results in a risk of stress corrosion cracks in the wall of the control rod which surrounds the absorber rod.

Furthermore, this phenomenon is accentuated by the locally increased expansion at the ends of the absorber rods.

In absorber bodies a so-called self-shielding exists, i.e. that peripheral areas of the absorber body have such a radiation absorbing ability that only a reduced amount of radiation reaches into the central portion of the body. The centre of the absorber bodies will therefore be exposed to a smaller amount of radiation than their peripheral portions. Tensions will arise between the centre and the peripheral portions, since the latter are the subject of an increased expansion. In the worst case the tensions may become so large in the axial direction that the absorber rod-breaks. A solid rod would, based on experience, because of inner tensions thereby break into pieces which have a length which essentially corresponds to the diameter of the rod. Such a splitting of an absorber rod into a plurality of pieces is not wanted.

SUMMARY OF THE INVENTION

The purpose with the present invention is to obtain an absorber body which has such a shape that the above mentioned disadvantages are reduced or completely eliminated. The absorber body should also be simple and inexpensive to produce.

This purpose is achieved by an absorber body as initially defined, which is characterised in that it comprises at least one area with a locally reduced thickness. By providing the absorber body with such an area, a local expansion space is created in this area. The area may be designed such that the periphery of the absorber body locally may be allowed to expand just there, whereby tensions between the centre of the absorber body and its peripheral areas are reduced and a breakage of the absorber body caused by the presence of such tensions is avoided. By a suitable position of said area the tendency to bending of the body because of unevenly distributed radiation may also be reduced. The area with a locally reduced thickness may also have such a shape and extension that the absorber body tends to break at this area if it still is bent because of unevenly distributed radiation such that it applies pressure forces against surrounding control rod walls. The formation of stress corrosion cracks in the control rod wall caused in the above mentioned manner may thereby be reduced or eliminated.

According to a preferred embodiment, at least one area with a locally reduced thickness is defined by at least one recess, which is provided in an outer surface of the absorber body. By the provision of a recess, the area may be made very locally and a sharp and distinct expansion space may be formed. The recess thereby defines a space in which the outer portions of the absorber body may expand when they are exposed to a larger neutron flux than the centre of the absorber body. A recess is also simple to produce at the production of an absorber body.

According to a further preferred embodiment, the absorber body is elongated and said at least one recess extends transversely to the longitudinal direction of the absorber body. Since the recess extends in this manner, an axial expansion of the peripheral portion of the absorber body is made possible.

According to a further preferred embodiment, said at least one recess extends as a closed, annular loop around the circumference of the body. An expansion of the peripheral portion of the absorber body over the whole cross-section of the absorber body where the recess is provided is thereby made possible. Such a recess may in a simple manner be made so deep that the centre of the body in this area will be so weakened that the body will break there when it is exposed to bending forces, such as when it due to unevenly distributed radiation is bent such that it locally presses against the surrounding control rod wall. When the absorber body is a rod, it does not matter in which rotational position it is pushed into a receiving hole in the control rod blade, since a recess provided in this manner will allow an axial expansion of the peripheral portion of the body over the whole cross-section of the body.

According to a further preferred embodiment, said at least one recess covers approximately 2–15% of the total area of said outer surface, preferably 5–10%. For a typical absorber rod with a length of about 100 mm and a diameter of about 5 mm a sufficient expansion space is thereby created for the peripheral portions of the rod in axial direction, at the same time as the recess or recesses form such a small part of the area of the outer surface and of the volume of the body that no significant reduction of the radiation absorption ability of the body is the case.

According to a further preferred embodiment, the absorber body is essentially rod-shaped and said outer surface is its envelope surface.

The provision of one or more areas of the absorber body with a reduced thickness, i.e. with a reduced diameter, gives a particularly good solution to the problem which the invention concerns.

According to a further preferred embodiment, the ratio between the depth d of said recess and the thickness t of the absorber body in the area of the recess is $d/t \leq 0.40$, preferably $d/t \leq 0.35$. At a larger depth than these an unwanted weakness of the absorber body in the area where its thickness is reduced is in some cases obtained. The ratio $d/t$ should, furthermore, be larger than 0.02 in order for the recess to have the functions which have been described above. One or more recesses with such a depth that $d/t$ is less than approximately 0.02 may also be provided, but have then to fulfil a completely different task, primarily to function as positions for initiating breaks of the rod where it may be wanted that it breaks.

According to a further preferred embodiment, a plurality of recesses is arranged at a distance from each other as seen in the longitudinal direction of the body. It is thereby avoided that tensions arise between the peripheral portions of the body and its centre due to the larger amount of radiation and the larger expansion to which the peripheral portion of the absorber body is exposed relative to its centre. The width of the recesses are advantageously adjusted to the distance between the same, such that the total width which the recesses together define forms approximately 2–15%, preferably 5–10% of the length of the absorber body when it has the shape of a rod with an arbitrary cross-section.

According to a further embodiment, the absorber body is elongated and said area is located at at least one of its ends. By locating the area with a reduced thickness to at least one of the ends of such an elongated body, a space for expansion is created at that end. Since the absorber body is exposed to increased radiation at the end, and thus is the subject of an increased expansion in this area it is by this feature avoided that the body expands so much in radial direction at that end that it because of this will generate pressure forces against the surrounding control rod wall. The end area will also not be as critical in this regard when the absorber body due to the fact that it is subjected to unevenly distributed radiation is somewhat bent. The thickness reduction in this area is suitably adjusted such that the thickness of the body in this area never during the lifetime of the absorber body expands to an unproportional size in relation to the thickness of the remaining parts of the absorber body. By the provision of the area with a reduced thickness at said end it is in the case of absorber rods of boron carbide possible to avoid the use of a cylinder of hafnium which according to prior technology is positioned farthest out in the channel in which the absorber body/bodies are positioned with the purpose of suppressing the neutron flux against the outermost end of the absorber rod.

According to a further preferred embodiment, said area is defined by a bevel of the body at said end. Such a bevel gives, inter alia, a gradual adjustment of the thickness of the absorber body up to its absolute end, where it thus is most narrow and where the neutron flux is largest and where the body is subject to the largest expansion in radial direction.

The invention also concerns a control rod for a nuclear energy arrangement, which control rod is characterised in that it comprises at least one absorber body with the above mentioned features. Further advantages with and features of the invention will be clear from the remaining dependent claims and from the following description.

SHORT DESCRIPTION OF THE DRAWINGS

The invention will hereafter in an exemplifying but not limiting purpose be described with reference to the annexed drawings, on which:

FIG. 1 is a side view of an embodiment of an absorber body according to the invention, FIG. 2 is a side view of a detail of the absorber body on an enlarged scale, FIG. 3 is a cross-sectional view according to III—III in FIG. 1, and FIG. 4 is a schematical perspective view of a control rod according to the invention.

DETAILED DESCRIPTION OF AN EMBODIMENT

In FIG. 1–3 an absorber body according to an embodiment of the invention is shown. The absorber body 1 is formed as a rod of a neutron absorbing material, here boron carbide, $B_4C$, with a length of approximately 100 mm, and a thickness t of in the order of magnitude 5.6 mm along a larger part of its length and with a reduced thickness of in the order of magnitude 5 mm at its two ends. As is clear from FIG. 3, the absorber body 1 has an essentially circular cross-section, whereby its thickness t is the same as its diameter.

The absorber body 1 comprises a plurality of areas 2, 3, 4 with a locally reduced thickness. Two such areas 2, 3 are arranged at the opposite ends of the absorber body 1. The areas 2, 3 are defined by a bevel of the absorber body 1 such that its thickness decreases in the direction towards the respective ends. The length l of the areas 2, 3 corresponds essentially to the thickness of the absorber body 1. The length l of the areas 2, 3 is in this case thus of the order of magnitude 5 mm. Considerable deviations from these measures may however be the case. Consequently, the maximal thickness reduction in these areas 2, 3 may be of in the order of magnitude 2–20%, preferably 5–15% and most preferred 7–12%. The length l of the areas 2, 3 may be of in the order of magnitude 0.25×t to 2×t, preferably 0.5×t to 1.5×t, and most preferred 0.7×t to 1.2×t. The areas 2, 3 do not have to be defined by a bevel of the absorber body 1, but could also be defined by a stepped reduction of the thickness of the absorber body 1.

A plurality of further areas 4 with a reduced thickness are also provided on the absorber body 1. These areas 4 are defined by recesses 4 or notches each of which extends around the circumference of the absorber body 1 and thereby defines circular notches in the same. At each recess 4 the absorber body 1 thus has a sharply marked waist which has a reduced thickness relative to the closest neighbouring portion 5 of the absorber body 1. The distance between the recesses 4 may vary and may for example be of in the order of magnitude 0.5×t to 10×t, preferably 1×t to 5×t, or, such as here, of in the order of magnitude 1.5×t to 2.5×t. The recesses 4 are essentially evenly distributed along the length of the absorber body 1. The material which is taken away for the provision for the respective notch 4 is small, i.e. the lowered absorption capacity of the absorber body 1 is small in relation to the possibility of expansion in axial direction of the peripheral portion of the body which such notches make possible.

The recesses 4 have a depth d which may vary considerably from case to case. In order not to weaken the absorber body too much, the ratio between the depth d of said recesses 4 and the thickness t of the absorber body 1 is $\leq 0.4$, preferably $\leq 0.35$. In the shown embodiment all recesses 4 have essentially the same depth, but they could be provided in such a manner that they alternately have a larger or smaller depth, respectively, along the length of the absorber body 1.

Each recess 4 has a width of in the order of magnitude 0.02×t to 0.4×t, preferably 0.05×t to 0.2×t. Thereby is meant the width of the recesses 4 at the outer surface of the absorber body 1. In the shown embodiment the width of the recesses 4 decreases in the direction towards the centre of the absorber body 1. The total width $b_{tot}$ for all recesses 4 along the length of the absorber body 1 constitutes here 5–10% of said length.

The recesses 4 reduce the existence of tensions between the peripheral portion of the absorber body 1 and its centre, whereby is meant the tensions which are caused due to the fact that a lower amount of radiation reaches the centre and that consequently the peripheral portions are subjected to a larger radiation induced expansion/swelling than the centre of the absorber body 1. Thanks to the existence of the recesses 4, the absorber body 1 will thus have an increased useful life in relation to a corresponding absorber body without said recesses 4. Such a solid rod will, based on experience, break into parts of about the length of the diameter or into a larger number of pieces than what is the case with the absorber body 1 provided with the recesses 4. Such a division of a solid rod leads, due to a certain repositioning, to a larger total axial elongation than the elongation which the centre part undergoes in the absorber body 1 provided with recesses 4 if this absorber body does not break.

In FIG. 4 a control rod for controlling a neutron flux in a nuclear energy arrangement of a conventional type is shown. The control rod comprises four blades 7 each of which comprises a plurality of channels 8 which extend from the free outer end of the respective blade 7 towards the centre of the control rod 6, where the blades meet. In at least some of said channels 8 an absorber body 1 according to the invention is provided, preferably hermetically enclosed. One longer or a plurality of shorter absorber bodies 1 may be arranged in such a channel 8.

It is obvious that the person skilled in the art will realise a plurality of possible variations and alternative embodiments of the subject of the invention without this person thereby leaving the scope of the invention. The invention should only be considered to be limited by the annexed claims, with support of the description and the annexed drawing.

For example, the dimension of individual absorber rods will be adjusted to the expected expansion in the different positions in the control rods. Furthermore, it would also be possible to let the at least one recess extend along a helical curve along the length of the absorber body.

What is claimed is:

1. An absorber body operable to absorb radiation in a nuclear reactor, comprising:
   an elongated rod of neutron absorbing material operable to be positioned in a channel in a control rod to control neutron flux in a nuclear reactor, the elongated rod comprising two ends and at least two areas with a locally reduced thickness, wherein a first of the areas with a locally reduced thickness is arranged at a first of the two ends of the elongated rod and a second of the areas with a locally reduced thickness is arranged at a second of the two ends of the elongated rod, wherein the areas with a locally reduced thickness, in addition to the first and second areas, comprise at least one recess arranged in an outer surface of the elongated rod between the first and second areas.

2. The absorber body according to claim 1, wherein the areas with a locally reduced thickness at the ends each comprise a bevel of the absorber body, wherein the bevels taper toward the ends of the elongated rod.

3. The absorber body according to claim 1, wherein the at least one recess extends transversely to a longitudinal direction of the elongated rod.

4. The absorber body according to claim 1, wherein the at least one recess extends around at least a part of the circumference of the elongated rod.

5. The absorber body according to claim 1, wherein the at least one recess extends as a closed, annular loop around the circumference of the elongated rod.

6. The absorber body according to claim 1, wherein the at least one recess covers approximately 2–15% of a total area of the outer surface of the elongated rod.

7. The absorber body according to claim 1, wherein the at least one recess covers approximately 5–10% of a total area of the outer surface of the elongated rod.

8. The absorber body according to claim 1, wherein the elongated rod comprises a cylindrical outer surface.

9. The absorber body according to claim 1, wherein a ratio between a depth (d) of the at least one recess and a thickness (t) of the absorber body in the vicinity of the at least one recess is less than or equal to 0.40.

10. The absorber body according to claim 1, wherein a ratio between a depth (d) of the at least one recess and a thickness (t) of the absorber body in the vicinity of the at least one recess is less than or equal to 0.35.

11. The absorber body according to claim 1, wherein a plurality of recesses are arranged in the outer surface of the elongated rod arranged at a distance from each other in the longitudinal direction of the elongated rod between the first and second areas.

12. The absorber body according to claim 11, wherein said plurality of recesses together cover approximately 2–15% of a total area of the outer surface of the elongated rod.

13. The absorber body according to claim 12, wherein said plurality of recesses together cover approximately 5–10% of a total area of the outer surface of the elongated rod.

14. A device operable to control neutron flux in a nuclear reactor, comprising:
   a control rod comprising four blades that extend from a center of the control rod, each blade comprising a free outer end and a plurality of channels that extend from the free outer end toward the center of the control rod; and
   an absorber body arranged in at least some of the channels, the absorber body comprising an elongated rod of neutron absorbing material operable to control the neutron flux in the nuclear reactor, the elongated rod comprising two ends and at least two areas with a locally reduced thickness, wherein a first of the areas with a locally reduced thickness is arranged at a first of the two ends and a second of the areas with a locally reduced thickness is arranged at a second of the two ends of the absorber body.

15. The device according to claim 14, wherein the areas with a locally reduced thickness at the ends each comprise a bevel-of the absorber body, wherein the bevels taper toward the ends of the elongated rod.

16. The device according to claim 14, wherein the elongated rod comprises a cylindrical outer surface.

* * * * *